(12) United States Patent
Heppe et al.

(10) Patent No.: US 7,798,445 B2
(45) Date of Patent: Sep. 21, 2010

(54) SYSTEMS AND METHODS FOR RECOVERING AND CONTROLLING POST-RECOVERY MOTION OF UNMANNED AIRCRAFT

(75) Inventors: Stephen B. Heppe, Hood River, OR (US); Jaime Mack, White Salmon, WA (US)

(73) Assignee: Insitu, Inc., Bingen, WA (US)

( * ) Notice: Subject to any disclaimer, the term of this patent is extended or adjusted under 35 U.S.C. 154(b) by 272 days.

(21) Appl. No.: 12/020,131

(22) Filed: Jan. 25, 2008

(65) Prior Publication Data

US 2009/0189016 A1 Jul. 30, 2009

(51) Int. Cl.
*B64F 1/02* (2006.01)

(52) U.S. Cl. .............. 244/110 E; 244/110 F; 244/110 R; 244/100 A

(58) Field of Classification Search .......... 244/110 E, 244/110 F, 110 R, 100 A, 107, 100 R; 114/261, 114/262
See application file for complete search history.

(56) References Cited

U.S. PATENT DOCUMENTS

| | | | |
|---|---|---|---|
| 965,881 | A | 8/1910 | Draper |
| 968,339 | A | 8/1910 | Geraldson |
| 975,953 | A | 11/1910 | Hourwich |
| 1,144,505 | A | 6/1915 | Steffan |
| 1,164,967 | A | 12/1915 | Thorp |
| 1,317,631 | A | 9/1919 | Kinser |
| 1,383,595 | A | 7/1921 | Black |
| 1,384,036 | A | 7/1921 | Anderson |
| 1,428,163 | A | 9/1922 | Harriss |
| 1,499,472 | A | 7/1924 | Hazen |
| 1,530,010 | A | 3/1925 | Neilson |
| 1,556,348 | A | 10/1925 | Ray et al. |
| 1,624,188 | A | 4/1927 | Simon |
| RE16,613 | E | 5/1927 | Moody et al. |
| 1,634,964 | A | 7/1927 | Steinmetz |
| 1,680,473 | A | 8/1928 | Parker |

(Continued)

FOREIGN PATENT DOCUMENTS

DE 4301671 7/1993

(Continued)

OTHER PUBLICATIONS

International Search Report and Written Opinion, International Application No. PCT/US09/31870; Applicant: Insitu, Inc., mailed Mar. 23, 2009, 12 pages.

(Continued)

*Primary Examiner*—Christopher P Ellis
(74) *Attorney, Agent, or Firm*—Perkins Coie LLP

(57) ABSTRACT

Systems and methods for recovering unmanned aircraft and controlling post-recovery motion of the aircraft are disclosed herein. An aircraft recovery system for recovering an unmanned aircraft in flight in accordance with one embodiment of the disclosure, for example, can include an inflatable aircraft recovery system having an inflatable portion with a generally vertical orientation. The inflatable portion can also include a landing pocket extending at least partially therethrough. The landing pocket is sized to receive at least a portion of a fuselage of the aircraft. The aircraft recovery system can also include a guidance system at least proximate to the landing pocket and positioned to guide the aircraft toward the landing pocket.

26 Claims, 4 Drawing Sheets

U.S. PATENT DOCUMENTS

| | | |
|---|---|---|
| 1,686,298 A | 10/1928 | Uhl |
| 1,712,164 A | 5/1929 | Peppin |
| 1,716,670 A | 6/1929 | Sperry |
| 1,731,091 A | 10/1929 | Belleville |
| 1,737,483 A | 11/1929 | Verret |
| 1,738,261 A | 12/1929 | Perkins |
| 1,748,663 A | 2/1930 | Tucker |
| 1,756,747 A | 4/1930 | Holland |
| 1,777,167 A | 9/1930 | Forbes |
| 1,816,976 A | 8/1931 | Kirkham |
| 1,836,010 A | 12/1931 | Audrain |
| 1,842,432 A | 1/1932 | Stanton |
| 1,869,506 A | 8/1932 | Richardson |
| 1,892,357 A | 12/1932 | Moe |
| 1,912,723 A | 6/1933 | Perkins |
| 1,925,212 A | 9/1933 | Steiber |
| 1,940,030 A | 12/1933 | Steiber |
| 1,960,264 A | 5/1934 | Heinkel |
| 2,333,559 A | 11/1943 | Grady et al. |
| 2,342,773 A * | 2/1944 | Wellman .................... 114/261 |
| 2,347,561 A | 4/1944 | Howard et al. |
| 2,360,220 A | 10/1944 | Goldman |
| 2,364,527 A | 12/1944 | Haygood |
| 2,365,778 A | 12/1944 | Schwab |
| 2,365,827 A | 12/1944 | Liebert |
| 2,380,702 A | 7/1945 | Persons |
| 2,390,754 A | 12/1945 | Valdene |
| 2,435,197 A | 2/1948 | Brodie |
| 2,436,240 A | 2/1948 | Wiertz |
| 2,448,209 A | 8/1948 | Boyer et al. |
| 2,465,936 A | 3/1949 | Schultz |
| 2,488,050 A | 11/1949 | Brodie |
| 2,515,205 A | 7/1950 | Fieux |
| 2,526,348 A | 10/1950 | Gouge |
| 2,669,403 A | 2/1954 | Milligan |
| 2,735,391 A | 2/1956 | Buschers |
| 2,814,453 A | 11/1957 | Trimble et al. |
| 2,843,342 A | 7/1958 | Ward |
| 2,844,340 A | 7/1958 | Daniels et al. |
| 2,908,240 A | 10/1959 | Hodge |
| 2,919,871 A | 1/1960 | Sorensen |
| 2,933,183 A | 4/1960 | Koelsch |
| 3,069,118 A | 12/1962 | Bernard |
| RE25,406 E | 6/1963 | Byrne et al. |
| 3,163,380 A | 12/1964 | Brodie |
| 3,268,090 A | 8/1966 | Wirkkala |
| 3,454,244 A | 7/1969 | Walander |
| 3,468,500 A | 9/1969 | Carlsson |
| 3,484,061 A | 12/1969 | Niemkiewicz |
| 3,516,626 A | 6/1970 | Strance et al. |
| 3,684,219 A | 8/1972 | King |
| 3,708,200 A | 1/1973 | Richards |
| 3,765,625 A | 10/1973 | Myhr et al. |
| 3,771,484 A * | 11/1973 | Schott et al. ................ 114/265 |
| 3,827,660 A | 8/1974 | Doolittle |
| 3,939,988 A | 2/1976 | Wellman et al. |
| 3,943,657 A | 3/1976 | Leckie et al. |
| 3,980,259 A | 9/1976 | Greenhalgh et al. |
| 4,067,139 A | 1/1978 | Pinkerton et al. |
| 4,079,901 A | 3/1978 | Mayhew et al. |
| 4,143,840 A | 3/1979 | Bernard et al. |
| 4,147,317 A | 4/1979 | Mayhew et al. |
| D256,816 S | 9/1980 | McMahon et al. |
| 4,236,686 A | 12/1980 | Barthelme et al. |
| 4,238,093 A | 12/1980 | Siegel et al. |
| 4,279,195 A | 7/1981 | Miller |
| 4,296,894 A | 10/1981 | Schnabele et al. |
| 4,296,898 A | 10/1981 | Watson |
| 4,311,290 A | 1/1982 | Koper |
| 4,408,737 A | 10/1983 | Schwaerzler et al. |
| 4,410,151 A | 10/1983 | Hoppner et al. |
| 4,471,923 A | 9/1984 | Hoppner et al. |
| 4,523,729 A | 6/1985 | Frick et al. |
| 4,566,658 A | 1/1986 | DiGiovanniantonio et al. |
| 4,645,142 A | 2/1987 | Soelter |
| 4,653,706 A * | 3/1987 | Ragiab .................... 244/110 E |
| 4,678,143 A | 7/1987 | Griffin et al. |
| 4,730,793 A | 3/1988 | Thurber, Jr. et al. |
| 4,753,400 A | 6/1988 | Reuter et al. |
| 4,790,497 A | 12/1988 | Yoffe et al. |
| 4,809,933 A | 3/1989 | Buzby et al. |
| 4,842,222 A | 6/1989 | Baird et al. |
| 4,909,458 A | 3/1990 | Martin et al. |
| 4,979,701 A | 12/1990 | Colarik et al. |
| 5,007,875 A | 4/1991 | Dasa |
| 5,039,034 A | 8/1991 | Burgess et al. |
| 5,042,750 A | 8/1991 | Winter |
| 5,054,717 A | 10/1991 | Taylor et al. |
| 5,109,788 A | 5/1992 | Heinzmann et al. |
| 5,119,935 A | 6/1992 | Stump et al. |
| 5,253,605 A | 10/1993 | Collins |
| 5,253,606 A | 10/1993 | Ortelli et al. |
| 5,259,574 A * | 11/1993 | Carrot .................... 244/100 A |
| 5,509,624 A | 4/1996 | Takahashi et al. |
| 5,560,568 A | 10/1996 | Schmittle |
| 5,583,311 A * | 12/1996 | Rieger ........................ 89/1.11 |
| 5,655,944 A | 8/1997 | Fusselman |
| 5,687,930 A | 11/1997 | Wagner et al. |
| 5,906,336 A | 5/1999 | Eckstein |
| 6,237,875 B1 * | 5/2001 | Menne et al. ........... 244/138 R |
| 6,264,140 B1 | 7/2001 | McGeer et al. |
| 6,371,410 B1 * | 4/2002 | Cairo-Iocco et al. .... 244/100 A |
| 6,416,019 B1 | 7/2002 | Hilliard et al. |
| 6,457,673 B1 | 10/2002 | Miller |
| 6,478,650 B1 | 11/2002 | Tsai et al. |
| 6,626,077 B1 | 9/2003 | Gilbert |
| 6,695,255 B1 * | 2/2004 | Husain .................... 244/110 E |
| 6,835,045 B1 | 12/2004 | Barbee et al. |
| 7,059,564 B2 | 6/2006 | Dennis |
| 7,066,430 B2 | 6/2006 | Dennis et al. |
| 7,090,166 B2 | 8/2006 | Dennis et al. |
| 7,114,680 B2 | 10/2006 | Dennis |
| 7,121,507 B2 | 10/2006 | Dennis et al. |
| 7,128,294 B2 | 10/2006 | Roeseler et al. |
| 7,140,575 B2 | 11/2006 | McGeer et al. |
| 7,143,974 B2 | 12/2006 | Roeseler et al. |
| 7,152,827 B2 | 12/2006 | McGeer |
| 7,165,745 B2 | 1/2007 | McGeer et al. |
| 7,175,135 B2 | 2/2007 | Dennis et al. |
| 7,264,204 B1 | 9/2007 | Portmann |
| 2002/0100838 A1 | 8/2002 | McGeer et al. |
| 2003/0222173 A1 | 12/2003 | McGeer et al. |
| 2006/0006281 A1 * | 1/2006 | Sirkis .................... 244/100 A |
| 2008/0156932 A1 * | 7/2008 | McGeer et al. ........... 244/110 C |
| 2008/0191091 A1 * | 8/2008 | Hoisington et al. ...... 244/110 F |
| 2009/0224097 A1 * | 9/2009 | Kariv ........................ 244/63 |

FOREIGN PATENT DOCUMENTS

| | | |
|---|---|---|
| FR | 854371 | 4/1940 |
| GB | 2080216 | 2/1982 |
| GB | 2150895 | 7/1985 |
| GB | 2219777 | 12/1989 |
| IL | 76726 | 1/1991 |
| JP | 07304498 | 11/1995 |
| WO | WO-0075014 | 6/2000 |
| WO | WO-0107318 | 2/2001 |

OTHER PUBLICATIONS

"Unmanned Aerial Systems (UAS) at AUSA 06," http://www.defense-update.com/events/2006/summary/ausa06uas.htm, Jul. 14, 2008.

Dickard, H.E., "Mini-RPV Recovery System Conceptual Study," Aug. 1977, Contract DA4J02-76-C-0048, Report No. USAAMRDL-TR077-24.

Leva, Scott A., "Dual chamber-Soft impact AIR BAG," http://precisionstunts.com/airbags/default.html, Jul. 14, 2008.

Leva, Scott A., "One of a kind Air Bag built specifically for Cirque Du Soleil at their Las Vegas show," http://precisionstunts.com/airbags3/default.html, Jul. 14, 2008.

Leva, Scott A., "Precision Air Bag—75'-100' / 22.8 m-30.4 m," http://precisionstunts.com/airbags/default.html, Jul. 14, 2008.

Phillips, K.; "Alternate Aquila Recovery System Demonstration Recovery System Flight Test;" Final Report; Jan. 19, 1977; 67 pages.

Robinson, Russell N., "Dynamic Analysis of a Carousel Remotely Piloted Vehicle Recovery System," 1977, Naval Post-Graduate School Master's Thesis, No. ADA052401.

Whitmore et al., "Development of a Closed-Loop Strap Down Attitude System for an Ultrahigh Altitude Flight Experiment," Jan. 1997, NASA Technical Memorandum 4775.

"Ames Builds Advanced Yawed-Wing RPV," Aviation Week and Space Technology, Jan. 22, 1973, p. 73.

"Formations 3 (UK) Division," http://www.armedforces.co.uk/army/listings/l0010.html, Jul. 14, 2008.

"Hermes 180," http://www.israeli-weapons.com/weapons/aircraft/uav/hermes_180/Hermes_180.html, Jul. 14, 2008.

"KZO— Reconnaissance and target detection drone," http://www.rheinmetall-detec.de/product.php?fid=1599&lang=3, Jul. 14, 2008.

"Military Parachutes—Cargo Parachutes—Search & Rescue—Aerial Delivery Equipment," http://www.airborne-sys.com/productlisting.htm, Jul. 14, 2008.

"Model 324 Mid Range UAV," http://fas.org/irp/program/collect/M324-System-Desc.pdf, Jul. 14, 2008.

"Phoenix Unmaned Aerial Vehicle, United Kingdom," http://www.army-technology.com/project_printable.asp?ProjectID=1884, Jul. 14, 2008.

"Rafael Demonstrates Skylite B Mini-UAV Yo Israel Defense Forces," http://www.spacewar.com/reports/Rafael_Demonstrates_Skylite_B_Mini_UAV_Yo_lsrael_Defense—Forces.html, Jul. 14, 2008.

"Sojka Spreads Its Wings," http://afcea.org/signal/articles/anmviewer.asp?a=1020&print=yes, Jul. 14, 2008.

"Teledyne Awarded FCS Unmanned Aerial Vehicle Contract," http://investquest.com/iq/t/tdy/ne/news/tdy082305fcs.htm, Jul. 14, 2008.

* cited by examiner

SYSTEMS AND METHODS FOR RECOVERING AND CONTROLLING POST-RECOVERY MOTION OF UNMANNED AIRCRAFT

TECHNICAL FIELD

The present disclosure relates generally to systems and methods for recovering unmanned aircraft and controlling post-recovery motion of the aircraft.

BACKGROUND

Unmanned aircraft or air vehicles (UAVs) provide enhanced and economical access to areas where manned flight operations are unacceptably costly and/or dangerous. For example, unmanned aircraft outfitted with remotely operated movable cameras can perform a wide variety of surveillance missions, including spotting schools of fish for the fisheries industry, monitoring weather conditions, providing border patrols for national governments, and providing military surveillance before, during, and/or after military operations.

Many unmanned aircraft systems (which can include the aircraft itself along with launch devices and recovery devices), however, can be difficult to install and operate in cramped quarters, such as the deck of a small fishing boat, land vehicle, or other craft. Accordingly, operating such aircraft systems often includes retrieving or capturing the aircraft with a vertically oriented flexible recovery line when space is insufficient for a normal landing run. While this technique has proven successful in many instances, there is a continual need to improve the effectiveness of systems with which aircraft are recovered.

DETAILED DESCRIPTION

A. Overview

The present disclosure describes systems and methods for recovering unmanned aircraft and controlling post-recovery motion of the aircraft. An aircraft recovery system for recovering an unmanned aircraft in flight in accordance with one embodiment of the disclosure, for example, can include an inflatable aircraft recovery system having an inflatable portion with a generally vertical orientation. The inflatable portion can also include a landing pocket extending at least partially therethrough. The landing pocket is sized to receive at least a portion of a fuselage of the aircraft. The aircraft recovery system can also include a guidance system at least proximate to the landing pocket and positioned to guide the aircraft toward the landing pocket.

Another aspect of the disclosure is directed to a method for recovering an unmanned aircraft in flight. The method can include inflating an aircraft recovery system to a desired pressure. The inflatable recovery system includes a first inflatable portion and a second inflatable portion positioned generally normal to the first inflatable portion. The method also includes flying an unmanned aircraft to intercept the recovery system and releasably capturing the aircraft in flight with the recovery system.

Many specific details of certain embodiments of the disclosure are set forth in the following description and in FIGS. 1-4 to provide a thorough understanding of these embodiments. Well-known structures, systems, and methods often associated with such systems have not been shown or described in detail to avoid unnecessarily obscuring the description of the various embodiments of the disclosure. In addition, those of ordinary skill in the relevant art will understand that additional embodiments may be practiced without several of the details described below.

Figure 1:
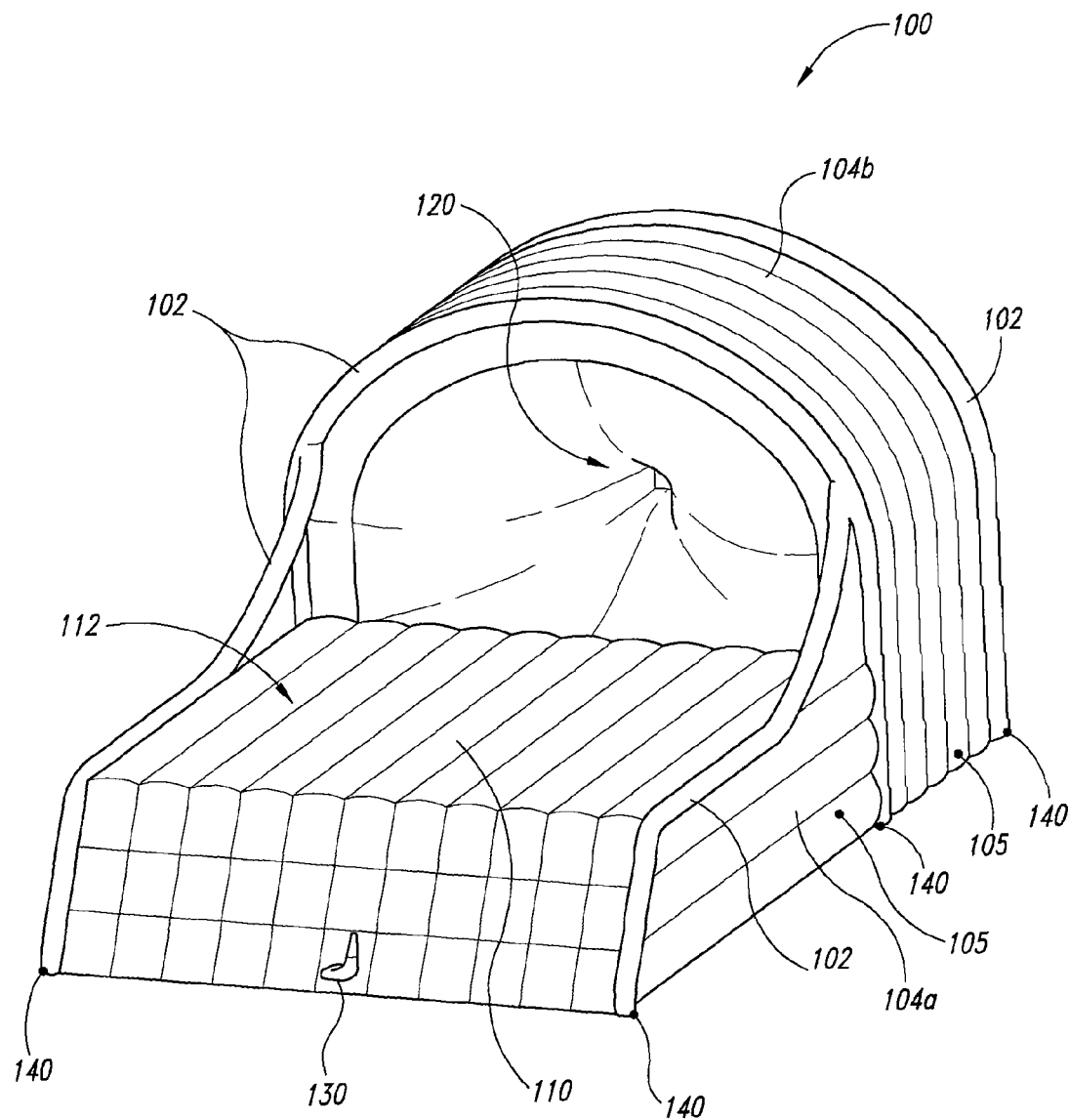
FIG. 1 is a partially schematic, isometric illustration of a system configured to recover an unmanned aircraft and control post-recovery motion of the aircraft in accordance with an embodiment of the disclosure.

B. Embodiments of Systems and Methods for Recovering and Controlling Post-Recovery Motion of Unmanned Aircraft FIG. 1 is a partially schematic, isometric illustration of an aircraft recovery system 100 configured to recover an unmanned aircraft (not shown) and control post-recovery motion of the aircraft in accordance with an embodiment of the disclosure. The aircraft recovery system 100 can include, for example, a frame 102 and one or more inflatable portions or airbags 104 (two are shown in the illustrated embodiment as a first inflatable portion 104a and a second inflatable portion 104b) carried by the frame 102. As described in greater detail below, the first and second inflatable portions 104a and 104b can each include one or more bladders filled to a desired pressure with a gas (e.g., air) and positioned in a landing zone to intercept an unmanned aircraft in flight. When the aircraft impacts the aircraft recovery system 100, the inflatable portions 104a and 104b are actively deformed and at least a portion of the gas is discharged via one-way valves 105 as the aircraft recovery system 100 absorbs the aircraft's landing forces and recovers the aircraft.

The first inflatable portion 104a is operably coupled (e.g., using Velcro®, snaps, or another suitable attachment feature) to the second inflatable portion 104b and positioned at an angle relative to the second inflatable portion 104b. In the illustrated embodiment, for the example, the aircraft recovery system 100 has a generally "L" shaped configuration. More specifically, the first inflatable portion 104a has a generally horizontal orientation and the second inflatable portion 104b has a generally vertical orientation such that the second inflatable portion 104b is generally normal to the first inflatable portion 104a. In this way, the first inflatable portion 104a can act as a runway or approach portion to assist in guiding the aircraft toward the vertically-oriented second inflatable portion 104b during landing or recovery operation. The first inflatable portion 104a may also provide stability to the second inflatable portion 104b. Furthermore, in several embodiments an upper surface 110 of the first inflatable portion 104a may be sloped downward toward the second inflatable portion 104b to at least approximately match an aircraft's flight path relative to the aircraft recovery system 100 during landing operations and assist in guiding the aircraft into the second inflatable portion 104b. In other embodiments, however, the upper surface 110 of the first inflatable portion 104a may not be sloped downward.

The first and second inflatable portions 104a and 104b can be composed of a rip-stop polyester material or another suitable lightweight, durable material. The material(s) of which the first and second inflatable portions 104a and 104b are composed can be fire resistant, UV resistant, tear resistant, and easily repairable. Furthermore, the material(s) may be provided in a variety of different colors and/or color schemes (e.g., camouflage) depending upon the desired operational requirements. In the illustrated embodiment, the first and second inflatable portions 104a and 104b are generally composed of the same material. In other embodiments, however, the first and second inflatable portions 104a and 104b may be composed of different materials. In still other embodiments, the first and/or second inflatable portions 104a and 104b may be composed of one or more materials having different qualities and/or characteristics than those discussed above.

The second inflatable portion 104b may also include a landing pocket or opening 120 positioned to receive at least a portion of a fuselage of the aircraft. The landing pocket 120, for example, can include a cavity sized to initially receive a nose portion of the fuselage during landing operations. The landing pocket 120 is described in greater detail below with reference to FIG. 2.

The first and second inflatable portions 104a and 104b can be inflated, for example, to a pressure of from about 1 psi to about 20 psi. In other embodiments, however, the first inflatable portion 104a and/or the second inflatable portion 104b can have a different pressure. The pressure can vary depending upon the size of the inflatable portions 104a and/or 104b, the desired operational characteristics, the environmental conditions, and one or more other factors. In several embodiments, the first and second inflatable portion 104a and 104b may be fluidly coupled together and share one or more common bladders. In other embodiments, however, the first and second inflatable portions 104a and 104b can be separate components having discrete bladders. In some embodiments, the system 100 may also include a safety monitor (not shown) operably coupled to the first and second inflatable portions 104a and 104b and configured to ensure that each inflatable portion is properly inflated prior to landing and recovery operations. The first and second inflatable portions 104a and 104b can be inflated using one or more fans (not shown) or other suitable inflation components.

The frame 102 can include an inflatable, semi-rigid, and/or generally rigid structure configured to support the first and second inflatable portions 104a and 104b. The frame 102 can be used, for example, to (a) hold the inflatable portions 104a and 104b in the desired position before landing operations, and (b) support the inflatable portions 104a and 104b during landing operations to help prevent the aircraft and its components from hitting the ground or surrounding structures with excessive force. In the embodiment illustrated in FIG. 1, for example, the frame 102 is an inflatable component that can be filled with a gas to a desired pressure (e.g., from about 5 psi to about 30 psi) and used to support the first and second inflatable portions 104a and 104b. Such an arrangement can be generally similar, for example, to an inflatable frame used in many kiteboarding systems. In other embodiments, however, the frame 102 can be composed of a semi-rigid (e.g., rubber) and/or a generally rigid (e.g., plastic or metal) material. In still other embodiments, the frame 102 can have a different arrangement and/or can be composed of different materials. Moreover, the frame 102 may not be included in some embodiments. In such instances, the first and second inflatable portions 104a and 104b may be supported using other suitable support assemblies and/or may be self-supporting components.

The aircraft recovery system 100 may also include a guidance system 130 at least proximate to the first and/or second inflatable portions 104a and 104b and configured to guide the aircraft toward the system 100 during landing operations. In the illustrated embodiment, for example, the guidance system 130 is a GPS antenna positioned at a front portion of the first inflatable portion 104a and configured to precisely and actively guide the aircraft into the landing pocket 120 for capture and recovery. The guidance system 130 can be carried by the system 100 or installed at a fixed location relative to the system 100. In the illustrated embodiment for example, the GPS antenna is carried by the first inflatable portion 104a. In other embodiments, the guidance system 130 may include two or more antennas or receivers carried by and/or positioned at desired locations relative to the system 100. For example, the guidance system 130 can include two GPS antennas positioned to precisely guide the aircraft along a desired flight path and to the aircraft recovery system 100. In still other embodiments, the guidance system 130 may include an instrument landing system (ILS), a microwave landing system (MLS), a visual guidance system, and/or other suitable guidance systems.

In several embodiments, a cover layer or reinforcement layer 112 (e.g., a "skid" sheet) can be removably positioned over at least a portion of the upper surface 110 of the first inflatable portion 104a and the landing pocket 120. The cover layer 112 can provide a desired level of friction between the aircraft and the system 100 and help prevent damage (e.g., tears, punctures, etc.) to the inflatable components 104a and 104b of the system 100 during landing and recovery operations. The cover layer 112 can include a rip-stop material or other suitable material. In several embodiments, the cover layer 112 may be composed of a different material than the first and second inflatable portions 104a and 104b. In other embodiments, however, the cover layer 112 and the first and second inflatable portions 104a and 104b may be composed of the same material. The cover layer 112 may not be included in some embodiments.

The system 100 may also include one or more tie downs or attachment features 140 (shown schematically) configured to releasably secure the first and second inflatable portions 104a and 104b to the ground or another suitable support platform (e.g., a truck or other suitable land vehicle, a boat or other water vehicle, or a building). The number of tie downs 140 can vary depending on the operational conditions.

In operation, the system 100 can be deployed to a desired location and configured as the primary device for landing and recovery operations. The system 100, for example, may be a modular system and an operator can transport the system components in a generally disassembled or partially assembled state to a landing zone and assemble the components on-site. In another embodiment, however, the system 100 may be transported to the desired landing zone in a generally assembled configuration. The first and second inflatable portions 104a and 104b can be inflated to a desired pressure when the system is at the desired location. Before, during, and/or after inflation, the system 100 can be pivoted or otherwise moved to a desired orientation (e.g., by an operator pulling on at least one corner of the first inflatable portion 104a or the second inflatable portion 104b) in preparation for landing and recovery operations.

Figure 2:
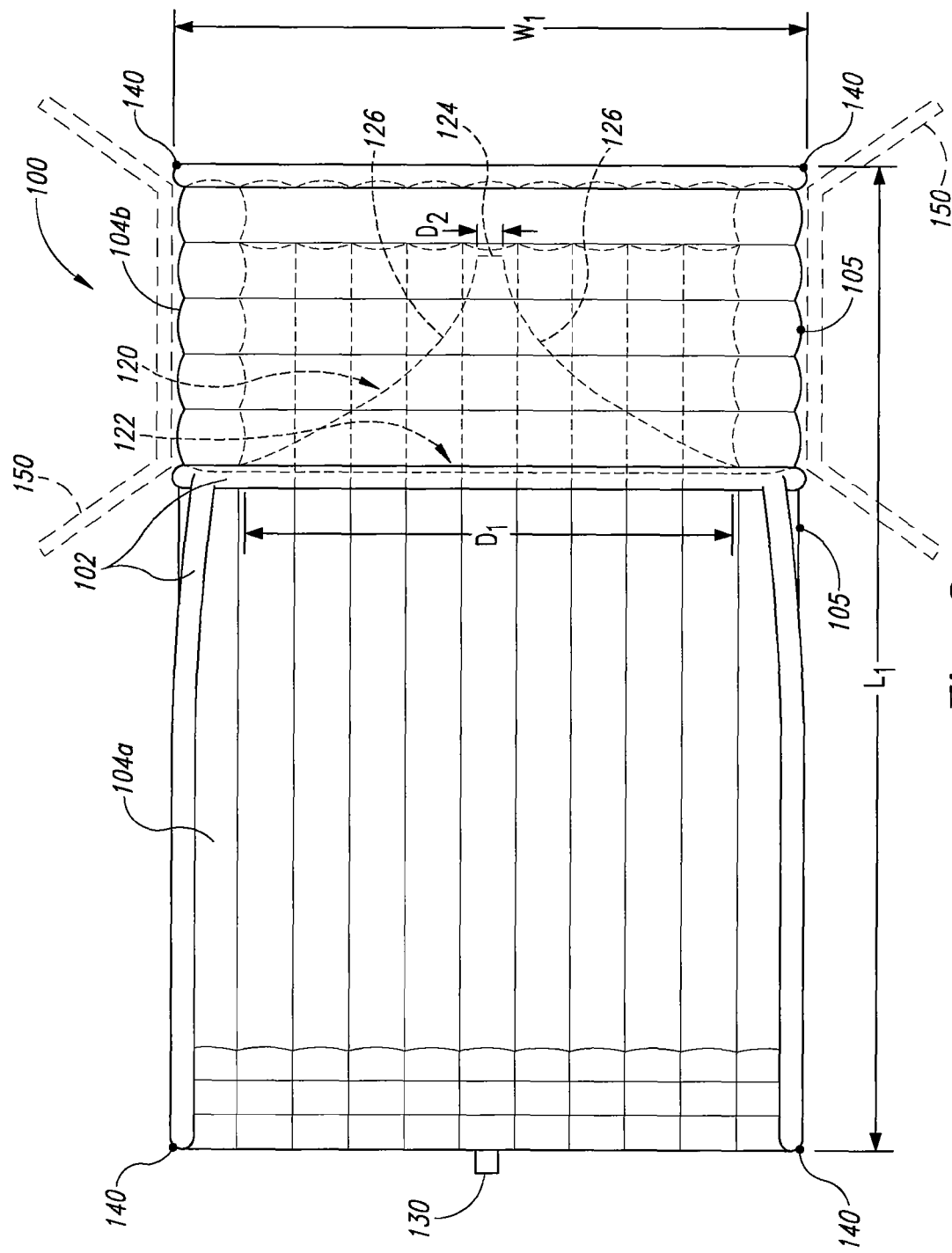
FIG. 2 is a partially schematic, top plan view of the system of FIG. 1

FIG. 2 is a partially schematic, top plan view of the aircraft recovery system 100 of FIG. 1. As best seen in FIG. 2, the landing pocket 120 (shown in broken lines) has a generally conical configuration with an opening 122 adjacent to the first inflatable portion 104a, a closed or end portion 124 facing away from the first inflatable portion 104a, and tapered lead-in surfaces 126 extending from the opening 122 to the end portion 124. The opening 122 has a cross-sectional dimension $D_1$, and the closed portion 124 has a cross-sectional dimension $D_2$ less than the cross-sectional dimension $D_1$. As described in greater detail below with reference to FIGS. 3A and 3B, the dimensions of the opening 122 can be based, at least in part, on the dimensions of the aircraft to be captured using the system 100. In other embodiments, the landing pocket 120 can have other suitable configurations.

The aircraft recovery system 100 is a scalable system that can be used as a primary aircraft recovery system for a variety of different aircraft configurations and/or arrangements. For example, the system 100 can have an overall length $L_1$ and width $W_1$ based, at least in part, on the particular dimensions of the aircraft to be recovered, the operational conditions of the aircraft, and/or the operational considerations of the system 100 (e.g., the location of the system 100, the desired transportability of the system 100, etc.). In one particular embodiment, for example, the length $L_1$ can be about 30 feet and width $W_1$ can be about 17 feet. In other embodiments, however, the length $L_1$ and width $W_1$ can vary.

In one alternative embodiment, the system 100 may not include the first inflatable portion 104a or the frame 120. The vertically-oriented second inflatable portion 104b may be supported by a frame 150 (shown in broken lines) having an A-frame configuration. In other embodiments, the second inflatable component 104b may be supported via other suitable frame structures or support arrangements.

Figure 3A:
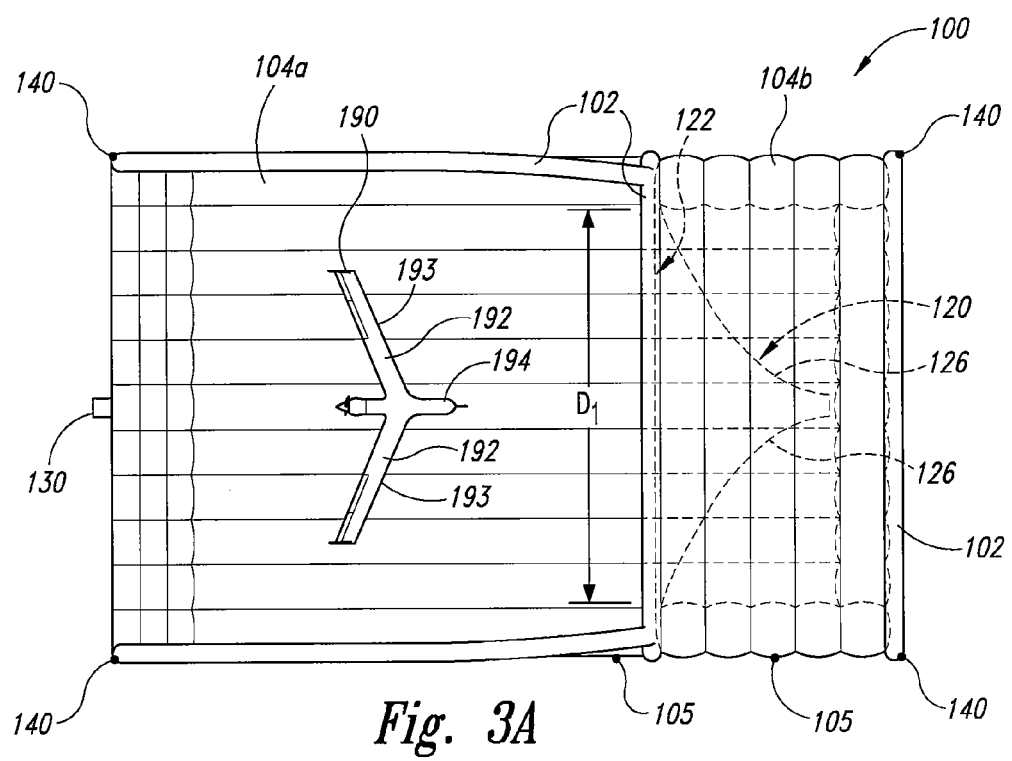
FIGS. 3A and 3B are partially schematic, top plan views of a system and method for recovering an unmanned aircraft in flight and controlling post-recovery motion of the aircraft in accordance with an embodiment of the disclosure.
Figure 3B:
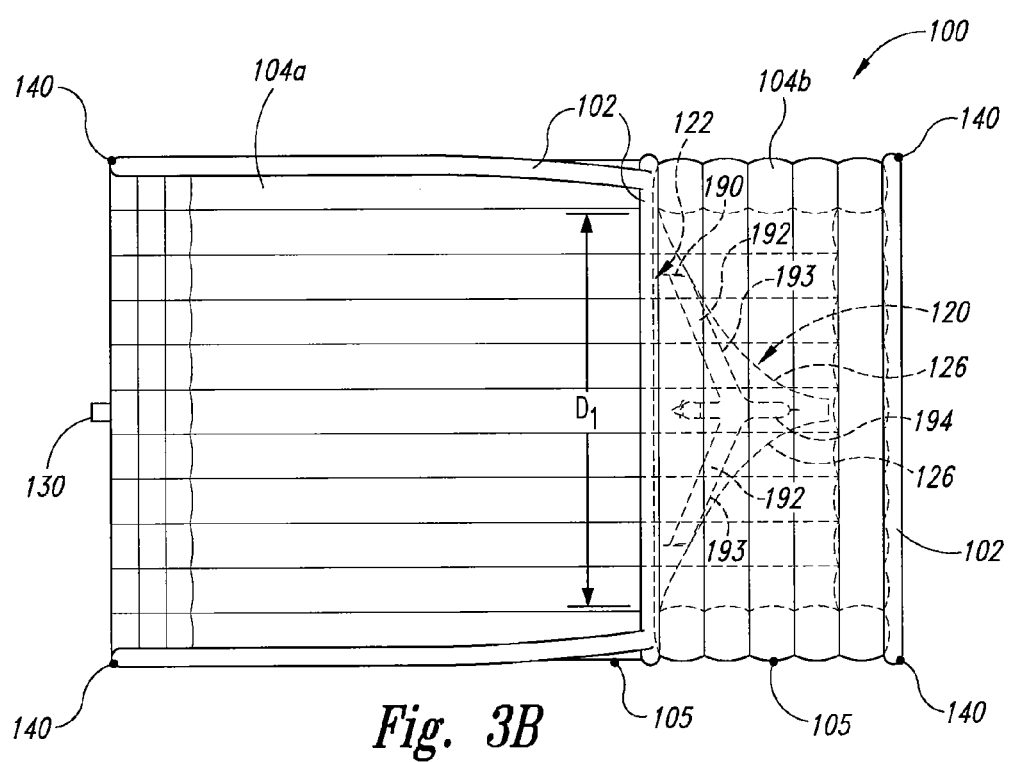

FIGS. 3A and 3B are partially schematic, top plan views of the system 100 recovering an unmanned aircraft 190 in flight and controlling post-recovery motion of the aircraft 190 in accordance with an embodiment of the disclosure. Beginning with FIG. 3A, the aircraft 190 is over the first inflatable portion 104a and is at least approximately aligned with the landing pocket 120. The guidance system 130 (shown schematically), which was described in detail above with respect to FIG. 1, can be used to precisely guide the aircraft 190 toward the system 100 and into the landing pocket 120.

Referring next to FIG. 3B, the aircraft 190 enters the landing pocket 120 and impacts the second inflatable portion 104b. As discussed above with reference to FIG. 2, the opening 122 of the landing pocket 120 has a dimension $D_1$. The dimension $D_1$ is generally greater than a spanwise dimension of the aircraft 190 such that the aircraft 190 can enter into the landing pocket 120 during capture and recovery operations. After the aircraft 190 enters the landing pocket 120, a leading edge portion 193 of at least one wing 192 of the aircraft 190 impacts the corresponding lead-in surfaces 126, while a nose portion 194 of the aircraft 190 initially remains at least generally out of contact with the second inflatable portion 104b. In this way, the wings 192 and corresponding structure can absorb a significant amount of the aircraft's landing forces. Moreover, because the stresses on the aircraft 190 during landing operations are primarily exerted on the wing structures during impact, the delicate components (e.g., turret, pitot tubes, etc.) at the nose portion 194 of the aircraft 190 and the other fragile portions of the aircraft 190 experience few or no stresses during landing operations.

In some situations, the aircraft 190 may be in a "crabbed" or angled configuration relative to the lead-in surfaces 126 and the wings 192 may not contact the lead-in surfaces 126 at the same time. Accordingly, the aircraft 190 may yaw after the first wing 192 makes initial contact and before the second wing 192 comes into contact with the corresponding lead-in surface 126. The landing pocket 120, however, is configured to help prevent excessive yawing of the aircraft 190 and to keep the nose portion 194 at least initially out of contact with the second inflatable portion 104b during landing operations.

After initial impact, the first and second inflatable portions 104a and 104b actively deform as the landing forces of the aircraft 190 are transferred to the system 100. Further, at least a portion of the gas in the first and second inflatable portions 104a and 104b is discharged via the respective one-way valves 105 as the system 100 absorbs the aircraft's landing forces and recovers the aircraft. The frame 102 can help support the inflatable portions 104a and 104b, as well as absorbing at least some of the landing forces. For example, in embodiments in which the frame 102 is an inflatable component, the frame 102 can also be configured to actively deform as the aircraft 190 impacts the second inflatable portion 104b. In other embodiments, however, the frame 102 may remain generally rigid during landing operations. In several embodiments, the tie downs 140 may also be configured to allow the system 100 to shift or move during capture operations and thereby assist in absorption of the landing forces. In other embodiments, however, the tie downs 140 may be configured hold the system 100 generally stationary during landing operations.

One feature of the system 100 and methods described above with reference to FIGS. 1-3B is that the system 100 can be quickly deployed and configured for landing operations in a variety of different environments and operational conditions. Many conventional recovery systems, for example, require elaborate and complex components that are relatively immobile and require a significant amount time and expense to deploy. In contrast with such conventional systems, the system 100 is a modular system that can be easily transported in a disassembled state to a wide variety of different operational environments, and quickly assembled and deployed for landing operations with minimal manpower. Moreover, the aircraft 190 can be quickly recovered from the system 100 after landing operations and prepared for storage and/or another mission.

Another feature of the system 100 described above is that it can be used to recover aircraft having a variety of different configurations in addition to the aircraft 190 described above with reference to FIGS. 3A and 3B. One advantage of this feature is that the system 100 can be used with existing fleets of unmanned aircraft without requiring expensive and/or time-consuming modifications to such aircraft. Furthermore, because the system 100 can be used with a variety of different aircraft, a single system 100 may be deployed and used for landing operations in a particular area or region for an entire fleet of different unmanned aircraft.

Figure 4:
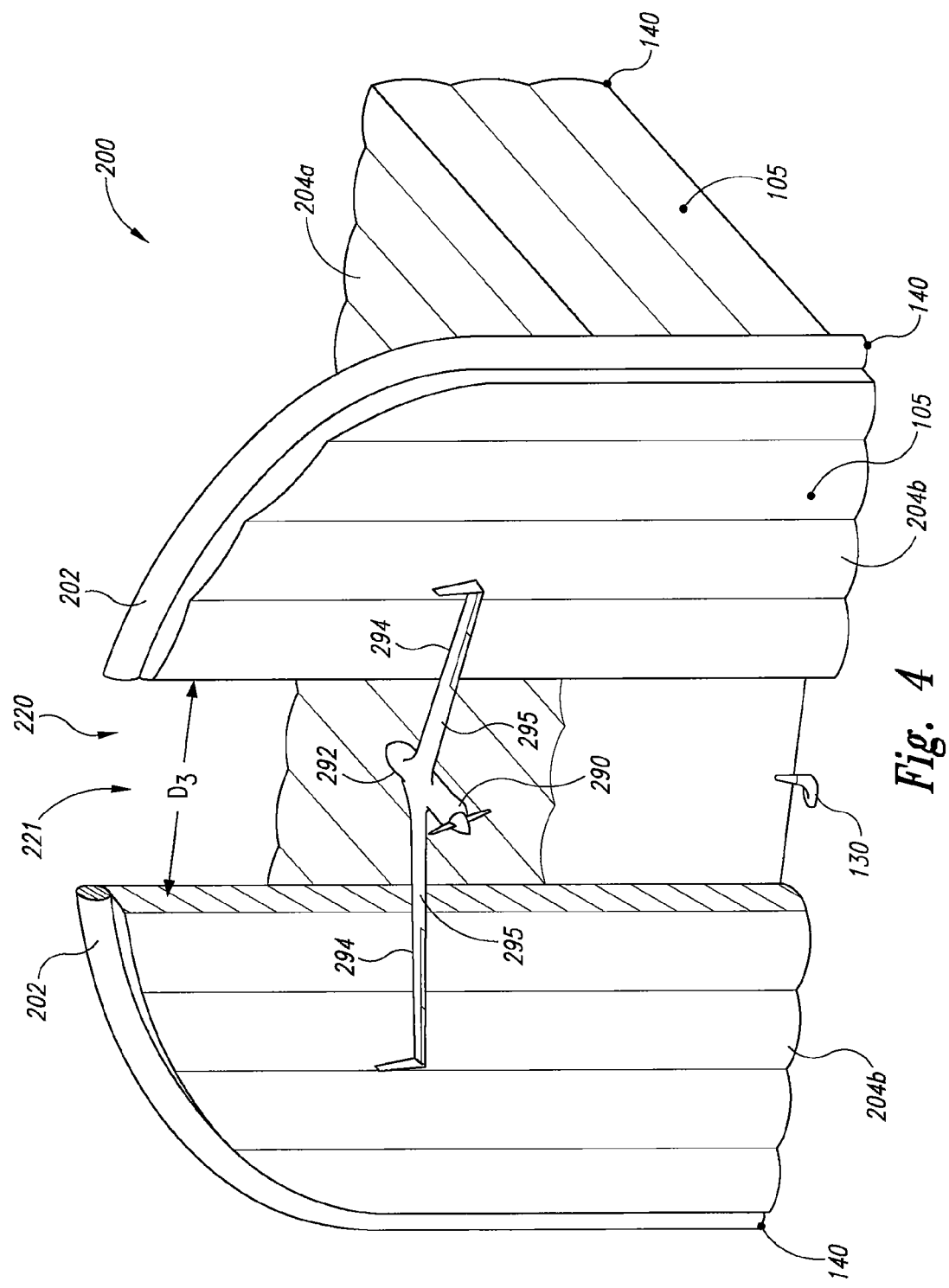
FIG. 4 is a partially schematic, isometric illustration of a system configured to recover an unmanned aircraft and control post-recovery motion of the aircraft in accordance with another embodiment of the disclosure.

C. Additional Embodiments of Systems and Methods for Recovering and Controlling Post-Recovery Motion of Unmanned Aircraft FIG. 4 is a partially schematic, isometric illustration of an aircraft recovery system 200 configured to recover an unmanned aircraft 290 and control post-recovery motion of the aircraft in accordance with another embodiment of the disclosure. The aircraft recovery system 200 can include, for example, a frame 202 and one or more inflatable portions or bladders 204 (two are shown in the illustrated embodiment as a first inflatable portion 204a and a second inflatable portion 204b) operably coupled to each other and carried by the frame 202. The system 200 differs from the system 100 described above with reference to FIGS. 1-3B in that the frame 202 and the first and second inflatable portions 204a and 204b have a different configuration relative to each other than the frame 102 and first and second inflatable portions 104a and 104b in the system 100.

More specifically, the second inflatable portion 204b in the system 200 is positioned such that the aircraft 290 impacts this portion before passing over or otherwise contacting the first inflatable portion 204a during landing operations. In the illustrated embodiment, the second inflatable portion 204b has a generally vertical orientation and the first inflatable portion 204a has a generally horizontal orientation and is generally normal to the second inflatable portion 204b. The first and second inflatable portions 204a and 204b can be composed of materials generally similar to the first and second inflatable portions 104a and 104b described above with reference to FIG. 1.

The second inflatable portion 204b may also include a landing pocket or opening 220 positioned to receive at least a portion of a fuselage of the aircraft. In the illustrated embodiment, for example, the landing pocket 220 comprises a slot 221 extending completely through the second inflatable portion 204b. The slot 221 has a width $D_3$ less than a spanwise dimension of the aircraft 290. As described in greater detail below, the slot 221 is configured to function in much the same way as the landing pocket 120 described above with reference to FIGS. 2-3B and help prevent damage to the fragile components at the nose and other portions of the aircraft 290.

The frame 202 can be generally similar to the frame 102 described above. For example, the frame 202 can include an inflatable component that can be filled with a gas to a desired pressure (e.g., from about 5 psi to about 30 psi) and used to support the second inflatable portion 204b. In several embodiments, the frame 202 may also be configured to support the first inflatable portion 204a. In other embodiments, the frame 202 may also include a semi-rigid or generally rigid component.

The system 200 also includes the guidance system 130 (shown schematically) at least proximate to the first and/or second inflatable portions 204a and 204b and configured to guide the aircraft 290 toward the system 200 during landing operations. In the illustrated embodiment, for example, the guidance system 130 positioned proximate to the slot 221. In other embodiments, however, the guidance system 130 can be positioned at a different location relative to the system 200.

In operation, the guidance system 130 precisely guides the aircraft 290 toward the system 200 and, more specifically, toward the landing pocket 220. As the aircraft 290 nears the system 200, a nose portion 292 of the aircraft 290 is at least partially received in the slot 221, while a leading edge portion 294 of each wing 295 contacts the second inflatable portion 204b. In this way, the wings 295 can absorb a significant amount of the aircraft's landing forces. Moreover, as with the system 100 described above, the delicate components (e.g., turret, pitot tubes, etc.) at the nose portion 292 of the aircraft 290 experience few or no stresses during landing operations because the landing stresses on are primarily exerted on the wing structures during impact.

After initial impact with the system 200, the frame 202 and the first and second inflatable portions 204a and 204b actively deform as the landing forces of the aircraft 290 are transferred to the system 200. Moreover, the system 200 may also include one or more tie downs 140 configured to allow the system 200 to shift or move during capture operations and thereby assist in absorption of the landing forces. In other embodiments, however, the tie downs 140 may be configured hold the system 200 generally stationary during landing operations.

From the foregoing, it will be appreciated that specific embodiments of the disclosure have been described herein for purposes of illustration, but that various modifications can be made without deviating from the spirit and scope of the disclosure. For example, the system 100 and/or 200 may include one or more additional inflatable portions. Moreover, specific elements of any of the foregoing embodiments can be combined or substituted for elements in other embodiments. For example, the landing pocket 220 in the system 200 may not extend completely through the second inflatable portion 204b. Furthermore, while advantages associated with certain embodiments of the disclosure have been described in the context of these embodiments, other embodiments may also exhibit such advantages, and not all embodiments need necessarily exhibit such advantages to fall within the scope of the invention. Accordingly, embodiments of the disclosure are not limited except as by the appended claims.

We claim:

1. An aircraft recovery system for recovering an unmanned aircraft in flight, the system comprising:
   an inflatable aircraft recovery system having an inflatable portion with a generally vertical orientation, wherein the inflatable portion has a landing pocket extending at least partially therethrough, and wherein the landing pocket is sized to receive at least a portion of a fuselage of the aircraft; and
   a guidance system at least proximate to the landing pocket and positioned to guide the aircraft toward the landing pocket.

2. The aircraft recovery system of claim 1 wherein the inflatable portion is a second inflatable portion, and wherein the system further comprises:
   a first inflatable portion operably coupled to the second inflatable portion, and wherein the first inflatable portion has a generally horizontal orientation and is positioned generally normal to the first inflatable portion; and
   a support structure carrying at least one of the first inflatable portion and the second inflatable portion.

3. The aircraft recovery system of claim 2 wherein the support structure is an inflatable structure coupled to at least one of the first and second inflatable portions.

4. The aircraft recovery system of claim 3 wherein:
   the first and second inflatable portions are filled with a gas to a first pressure and a second pressure, respectively; and
   the support structure is filled with a gas to a third pressure, and wherein the third pressure is greater than the first and second pressures.

5. The aircraft recovery system of claim 2 wherein:
   the first inflatable portion includes a plurality of inflatable bladders releasably coupled together; and
   the second inflatable portion includes a plurality of inflatable bladders operably coupled together and coupled to at least one of the support structure and the first inflatable portion.

6. The aircraft recovery system of claim 2 wherein:
   the first and second inflatable portions are positioned along a flight path of the aircraft such that the aircraft engages the second inflatable portion before passing over or contacting the first inflatable portion; and
   the landing pocket of the second inflatable portion comprises a slot extending completely through the second inflatable portion, and wherein the slot has a width greater than a fuselage of the aircraft and less than a spanwise dimension of the aircraft.

7. The aircraft recovery system of claim 1 wherein:
   the first and second inflatable portions are positioned along a flight path of the aircraft such that the aircraft passes over or contacts the first inflatable portion before the second inflatable portion; and the landing pocket comprises a generally conical cavity that does not extend completely through the second inflatable portion.

8. The aircraft recovery system of claim 1 wherein the inflatable portion includes a one-way valve that allows a gas within the inflatable portion to actively discharge during aircraft contact with the inflatable portion.

9. The aircraft recovery system of claim 1 wherein the recovery system is a primary system for recovering the aircraft.

10. The aircraft recovery system of claim 1 wherein the guidance system includes a GPS antenna.

11. The aircraft recovery system of claim 10 wherein the GPS antenna is carried by the inflatable portion.

12. The aircraft recovery system of claim 10 wherein the GPS antenna is spaced apart from the inflatable portion.

13. The aircraft recovery system of claim 1 wherein the inflatable portion is a second inflatable portion, and wherein the system further comprises:

a first inflatable portion having a generally horizontal orientation operably coupled to the second inflatable portion;

an inflatable frame positioned to carry at least one of the first and second inflatable portions and support the first and second inflatable portions during landing operations; and wherein the guidance system comprises a GPS antenna at least proximate to the first inflatable portion.

14. An apparatus for handling unmanned aircraft, the apparatus comprising:

an inflatable aircraft recovery system having a first airbag and a second airbag positioned generally normal to the first airbag, wherein the second airbag is positioned to contact at least a portion of a wing of the aircraft, and wherein the individual airbags include one-way valves configured to release a gas in the respective airbags during aircraft contact with the recovery system; and a GPS antenna positioned at least proximate to the recovery system, wherein the GPS antenna is positioned to guide the aircraft along a flight path to the recovery system.

15. The apparatus of claim 14 wherein the first airbag and the second airbag are composed of a polyester material.

16. The apparatus of claim 14, further comprising a cover layer removably positioned over at least a portion of an upper surface of first airbag, wherein the cover layer is selected to provide a desired level of friction between the aircraft and the first airbag.

17. The apparatus of claim 14, further comprising a frame operably coupled to the recovery system and positioned to support at least one of the first airbag and the second airbag.

18. The apparatus of claim 14 wherein the first airbag and the second airbag are inflatable to a pressure of from about 1 psi to about 20 psi.

19. A method for recovering an unmanned aircraft in flight, the method comprising:

inflating an aircraft recovery system to a desired pressure, the aircraft recovery system including a first inflatable portion and a second inflatable portion positioned generally normal to the first inflatable portion;

flying an unmanned aircraft to intercept the recovery system; and releasably capturing the aircraft with the recovery system, wherein at least a portion of a wing of the aircraft contacts the second inflatable portion during capture.

20. The method of claim 19 wherein the recovery system is a primary recovery system for the aircraft, and wherein releasably capturing the aircraft in flight with the recovery system comprises flying the aircraft to intercept the recovery system without contacting or engaging another structure.

21. The method of claim 19 wherein the first inflatable portion has a generally horizontal orientation and the second inflatable portion has a generally vertical orientation, and wherein:

flying an unmanned aircraft to intercept the recovery system comprises flying the aircraft to intercept a landing pocket extending at least partially through the second inflatable portion.

22. The method of claim 21 wherein flying the aircraft to intercept the landing pocket comprises flying the aircraft to intercept a generally conical cavity that extends only partially through the second inflatable portion.

23. The method of claim 21 wherein flying the aircraft to intercept the landing pocket comprises flying the aircraft to intercept a slot extending completely through the second inflatable portion, and wherein the slot has a width less than a spanwise dimension of the aircraft.

24. The method of claim 19 wherein inflating an aircraft recovery system to a desired pressure comprises filling the first inflatable portion and the second inflatable portion with a gas to a pressure of from about 1 psi to about 20 psi.

25. The method of claim 19 wherein the second inflatable portion is positioned generally normal to the first inflatable portion, and wherein;

inflating an aircraft recovery system to a desired pressure comprises inflating one or more bladders within the first and second inflatable portions to a desired pressure;

flying an unmanned aircraft to intercept the recovery system comprises at least partially guiding the aircraft along a flight path to the recovery system with a GPS antenna positioned at least proximate to the recovery system and toward a cavity extending at least partially through the second inflatable portion and positioned to receive a nose portion of the aircraft; and releasably capturing the aircraft with the recovery system comprises actively discharging a gas from one-way valves in the first and second inflatable portions during aircraft contact with the recovery system.

26. An aircraft recovery system for recovering an unmanned aircraft in flight, the system comprising:

an inflatable aircraft recovery system having a first inflatable portion having a generally horizontal orientation;

a second inflatable portion having a generally vertical orientation operably coupled to the first inflatable portion, wherein the second inflatable portion has a landing pocket extending at least partially therethrough, and wherein the landing pocket is sized to receive at least a portion of a fuselage of the aircraft; and an inflatable frame positioned to carry at least one of the first and second inflatable portions and support the first and second inflatable portions during landing operations; and a guidance system positioned to guide the aircraft toward the landing pocket, wherein the guidance system comprises a GPS antenna at least proximate to the first inflatable portion.

* * * * *